United States Patent
Takahashi

[11] Patent Number: 6,160,929
[45] Date of Patent: Dec. 12, 2000

[54] 2×2 OPTICAL FIBER SWITCH

[75] Inventor: Mitsuo Takahashi, Matsudo, Japan

[73] Assignee: Seikoh Giken Co., Ltd., Matsudo, Japan

[21] Appl. No.: 09/277,955

[22] Filed: Mar. 29, 1999

[30] Foreign Application Priority Data

Jun. 16, 1998 [JP] Japan .................................. 10-168272

[51] Int. Cl.$^7$ ..................................................... G02B 6/26
[52] U.S. Cl. ................................. 385/21; 385/16; 385/18
[58] Field of Search ................................. 385/16, 17, 18, 385/19, 20–23; 359/834

[56] References Cited

U.S. PATENT DOCUMENTS

| | | | |
|---|---|---|---|
| 5,436,986 | 7/1995 | Tsai | 385/16 |
| 5,642,446 | 6/1997 | Tsai | 385/16 |
| 5,877,876 | 3/1999 | Birdwell | 385/17 |

FOREIGN PATENT DOCUMENTS

| | | |
|---|---|---|
| 58021224 | 2/1983 | European Pat. Off. . |
| 60159720 | 8/1985 | European Pat. Off. . |
| 0 642 955 A1 | 3/1995 | European Pat. Off. . |
| 2 097 550 | 11/1982 | United Kingdom . |

*Primary Examiner*—Hemang Sanghavi
*Attorney, Agent, or Firm*—Venable; Robert J. Frank; Gabor J. Kelemen

[57] ABSTRACT

A 2×2 optical fiber switch has a structure that does not produce an alignment error between the position of the central axis of optical fiber assemblies with lenses and the symmetry center position of rectangular prisms, thereby obviating the need of the skill for assembling adjustment. The 2×2 optical fiber switch is provided with first, second, third, and fourth optical fiber assemblies with lenses that are disposed such that the optical axes thereof are parallel in the same reference plane. The optical fiber assemblies with lenses are supported by a lens holding member. A prism holding member is supported by the lens holding member such that it supports first and second prisms and moves between a coupling position and a retreated position in a direction perpendicular to the reference plane.

6 Claims, 6 Drawing Sheets

2×2 OPTICAL FIBER SWITCH

BACKGROUND OF THE INVENTION

1. Field of the Invention

The present invention relates to an optical fiber switch employed for an optical fiber communications system. More particularly, the invention relates to a 2×2 optical fiber switch that is provided with four optical fiber assemblies equipped with lenses, in which collimator lenses are matched to optical fibers, and that employs prisms to shift two optical fiber circuits in parallel to or across another two optical fiber circuits so as to switch the connection of the optical fiber circuits.

2. Description of the Related Art

There has been known a 2×2 optical fiber switch constituted using collimator lenses and prisms disclosed, for example, in U.S. Pat. No. 5,436,986. FIGS. 4A and 4B are schematic top plan views illustrating the operation of such a 2×2 optical fiber switch. An optical fiber 102 and a sleeve 103 are inserted in the central hole of a ferrule 101 to constitute a ferrule assembly with an optical fiber. A collimator lens 104 is provided coaxially on an end surface of the ferrule assembly with the optical fiber. Thus, four optical fiber lens assemblies 100A, 100B, 100C, and 100D are fabricated. Two each of these four optical fiber lens assemblies 100A through 100D are mounted on holders (not shown) such that they are coaxial and parallel to each other. Rectangular prisms 105 and 106 have short side surfaces 107 through 110 thereof provided with deposited reflection coat layer made of metal or the like.

The respective rectangular prisms 105 and 106 are secured to a holder plate 111. The rectangular prisms 105 and 106 are installed so that long sides 112 and 113 are parallel and rectangular intersection points 117 and 118 are located symmetrically. The holder plate 111 is engaged with a solenoid coil magnet which is not shown. If the direction of the axes of the optical fiber lens assemblies 100A through 100D is denoted by (Z), then the holder plate 111 is constructed so that it reciprocates in the direction of an axis (X) orthogonal to the optical axes (Z) when the current polarity of the solenoid coil magnet is switched.

FIG. 4A shows the holder plate Ill when it has advanced. In this state, a parallel beam emitted through the collimator lens of a left optical fiber lens assembly A is reflected by the reflection coat layer of the short side surface 108 of the rectangular prism 105 and projected onto the reflection coat layer of the short side surface 110 of the rectangular prism 106 as indicated by the white arrows. The projected parallel beam is further reflected by the reflection coat layer of the short side surface 110 of the rectangular prism 106 and enters the optical fiber of a left optical fiber lens assembly B.

Likewise, a parallel beam emitted through the collimator lens of a right optical fiber lens assembly D is reflected by the reflection coat layer of the short side surface 109 of the rectangular prism 106 and projected onto the reflection coat layer of the short side surface 107 of the rectangular prism 105 as indicated by the black arrows. The projected parallel beam is further reflected by the reflection coat layer of the short side surface 107 of the rectangular prism 105 and enters the optical fiber of a right optical fiber lens assembly C.

The 2×2 optical fiber switch constituted by using the conventional collimator lenses and prisms works as set forth above. With the holder plate 111 of FIG. 4A in the advanced position, the position of a central axis 114 of the left optical fiber lens assemblies A and B must be accurately aligned with a symmetry central line position 115 of the rectangular prisms 105 and 106. As shown in FIG. 5, if an alignment error of $e_1$ is produced between the position of the central axis 114 of the left optical fiber lens assemblies A and B and the symmetry central line position 115 of the rectangular prisms 105 and 106, then the central axis of the light beam incident on the optical fiber lens assembly B is decentered from the optical fiber axis of the optical fiber lens assembly B by $e_2=2e_1$.

FIG. 6 shows the values obtained by the experiments carried out by the assignee on the relationship between, decentering $e_2$ of the optical axis and insertion loss when a collimator lens having a diameter of 2 mm was used. As shown in FIG. 6, the insertion loss increases as the decentering $e_2$ of the optical axis increases. For instance, if $e_1$ is 25 $\mu$m, then $e_2$ will be 50 $\mu$m and the insertion loss will be about 0.37 dB. Hitherto, therefore, assembling adjustment skill for controlling, to a minimum, the alignment error of $e_1$ produced between the position of the central axis 114 of the optical fiber lens assemblies A and B and the symmetry central line position 115 of the rectangular prisms 105 and 106, or assembling adjustment skill for precisely position and fix the rectangular prisms 105 and 106 on the holder plate 111, or other similar skill has been necessary.

SUMMARY OF THE INVENTION

Accordingly, it is a major object of the present invention to provide a 2×2 optical fiber switch that alleviates the problem with the conventional 2×2 optical fiber switch set forth above.

It is a further specific object of the present invention to provide a 2×2 optical fiber switch featuring a structure that does not produce an alignment error between the position of the central axis of the optical fiber lens assemblies and the symmetry central line position of rectangular prisms, thereby obviating the need for the assembling adjustment skill.

It is yet another specific object of the present invention to provide a 2×2 optical fiber switch employing a prism holder that obviates the need of the positioning adjustment when aligning a pair of rectangular prisms.

To achieve the above objects, a 2×2 optical fiber switch comprises first and second optical fiber assemblies with lenses disposed so that optical axes thereof are parallel to each other within the same reference plane, a third optical fiber assembly with a lens disposed oppositely to said first optical fiber assembly with the lens on the same optical axis, an interval being maintained therebetween, a fourth optical fiber assembly with a lens disposed oppositely to said second optical fiber assembly with the lens on the same optical axis, an interval being maintained therebetween, a lens holding member for supporting said first through fourth optical fiber assemblies with lenses while maintaining said positional relationship, a first rectangular prism in which an inclined surface thereof is disposed oppositely to said first optical fiber assembly with the lens and said second optical fiber assembly with the lens so as to optically couple said first optical fiber assembly with the lens to said second optical fiber assembly with the lens, a second rectangular prism in which an inclined surface thereof is disposed oppositely to said third optical fiber assembly with the lens and said fourth optical fiber assembly with the lens so as to optically couple said third optical fiber assembly with the lens to said fourth optical fiber assembly with the lens, and a prism holding member which supports said first and second rectangular prisms and which is supported by said lens holding member so that it may move between said coupling position and a retreated position in a direction perpendicular to said reference plane.

Said first and second rectangular prisms are respectively inserted and bonded in two rectangular V grooves provided in said prism holding member.

Said lens holding member and said prism holding member are fabricated by plastic injection molding or precision die casting using an aluminum light alloy or the like.

Two through holes are provided in parallel within the reference plane of said lens holding member in order to support the optical fibers with lenses.

Two alignment V grooves are provided in parallel within the reference plane of said lens holding member in order to support the optical fibers with lenses.

Collimator lenses of said optical fibers with lenses are GRIN lenses.

DESCRIPTION OF THE PREFERRED EMBODIMENTS

Embodiments of the 2×2 optical fiber switch in accordance with the present invention will now be described in more detail primarily with reference to the accompanying drawings.

Figure 1A:
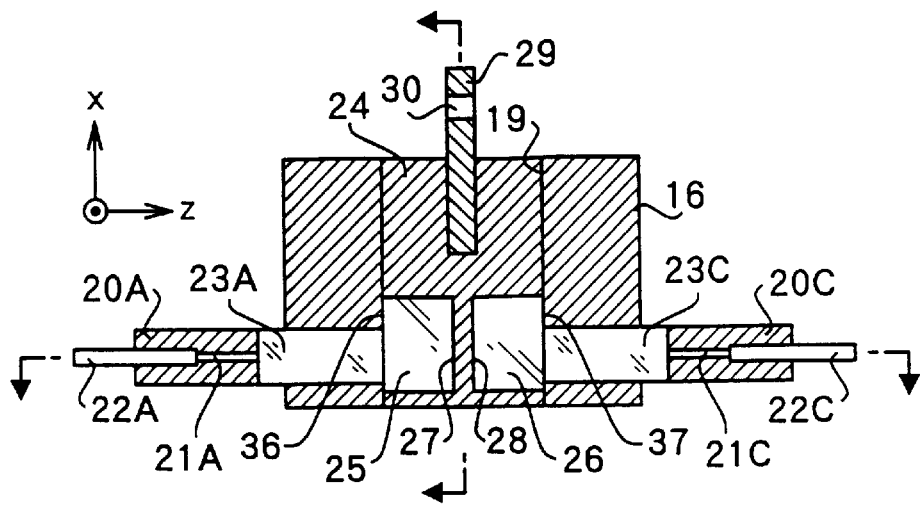
FIG. 1A is a top plan sectional view showing an embodiment of a 2×2 optical fiber switch in accordance with the present invention when it is in a first operating state.
Figure 1B:
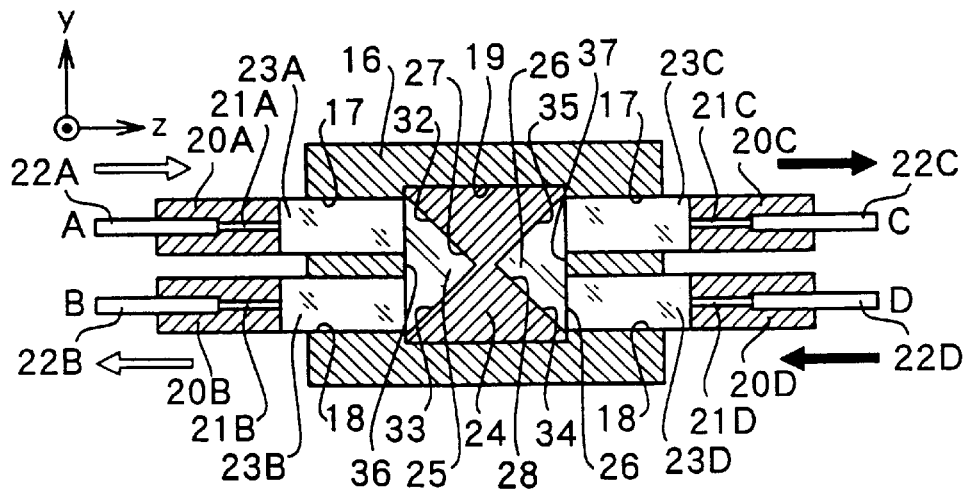
FIG. 1B is a longitudinal sectional view showing the embodiment in the foregoing operating state.
Figure 1C:
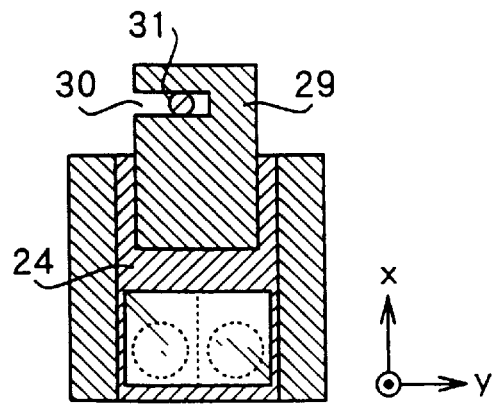
FIG. 1C is a side sectional view showing the embodiment in the foregoing operating state.
Figure 2A:
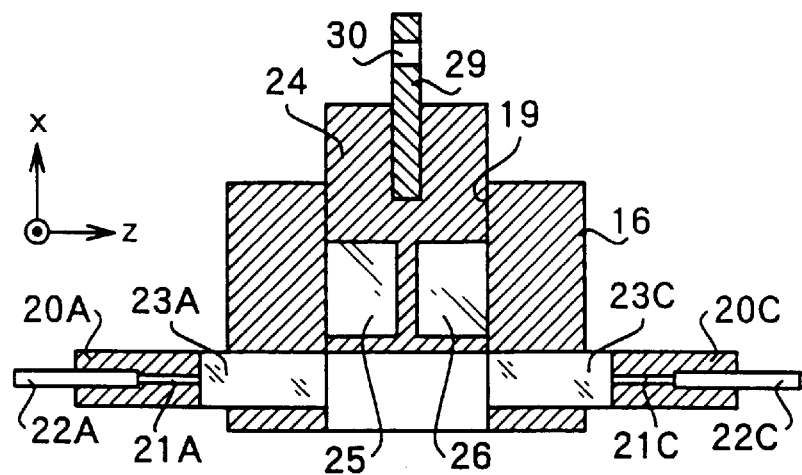
FIG. 2A is a top plan sectional view showing the embodiment in the second operating state.
Figure 2B:
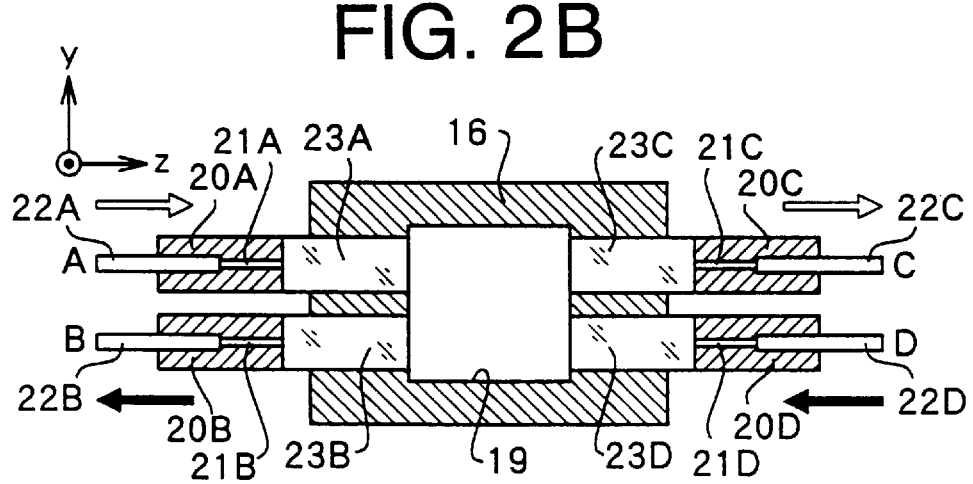
FIG. 2B is a longitudinal sectional view showing the embodiment in the foregoing operating state.
Figure 2C:
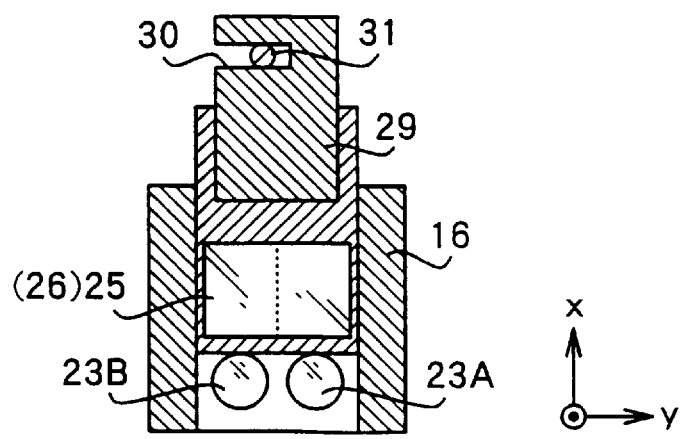
FIG. 2C is a side sectional view showing the embodiment in the foregoing operating state.

FIG. 1A is a top plan sectional view showing the embodiment of the 2×2 optical fiber switch in accordance with the present invention when it is in a first operating state wherein first and second optical fibers have been coupled and third and fourth optical fibers have been coupled as it will be discussed later. FIG. 1B is a longitudinal sectional view showing the embodiment in the foregoing operating state, and FIG. 1C is a side sectional view showing the embodiment in the foregoing operating state. FIG. 2A is a top plan sectional view showing the embodiment in a second operating state wherein first and third optical fibers have been coupled and second and fourth optical fibers have been coupled as it will be discussed later. FIG. 2B is a longitudinal sectional view showing the embodiment in the foregoing operating state, and FIG. 2C is a side sectional view showing the embodiment in the foregoing operating state.

A lens holding member 16 has two parallel holes 17 and 18 in a lengthwise direction (Z) with an interval maintained therebetween in a direction Y. Hereinafter, a plane, namely, a YZ plane that includes the center of these holes will be referred to as a reference plane. The optical axes of the lenses and optical fibers that will be discussed later are disposed within this plane. A square through hole 19 is provided in a direction X axially at right angles to the parallel holes 17 and 18.

A first optical fiber assembly A with a lens is constructed by inserting an optical fiber 21A and a sleeve 22A in the central hole of a collimator lens 23A and by attaching a ferrule 20A with the optical fiber thereto axially. A second optical fiber assembly B with a lens is constructed by inserting an optical fiber 21B and a sleeve 22B in the central hole of a collimator lens 23B and by attaching a ferrule 20B with the optical fiber thereto coaxially. A third optical fiber assembly C with a lens and a fourth optical fiber assembly D with a lens are constructed in the same manner. As shown in the drawings, these four optical fiber assemblies A, B, C, and D with lenses are respectively inserted into the parallel holes 17 and 18 of the lens holding member 16 to fabricate a lens holder assembly. The optical axes of the respective optical fiber assemblies with lenses exist in the aforesaid reference plane. The light beam emitted through the collimator lens 23A enters a collimator lens 23C in parallel, and the light beam emitted through a collimator lens 23D enters a collimator lens 23B in parallel.

The outside diameter of a prism holding member 24 is such that it enables the prism holding member to precisely and slidably fit in the square through hole 19 of the lens holding member. Provided on one end of the prism holding member 24 are rectangular V grooves 27 and 28 wherein two rectangular prisms 25 and 26 are installed by bonding, and provided on the other end thereof is a drive member 29 which engages an actuator (not shown). The drive member 29 is equipped with an engaging groove 30 which engages an elastic pin 31 or the like of the actuator (not shown). The rectangular prisms 25 and 26 are installed in the rectangular V grooves 27 and 28 of the prism holding member 24 by bonding. The lens holding member and the prism holding member may be made by plastic injection molding or precision die casting process using an aluminum light alloy. To assemble the 2×2 optical fiber switch main body in accordance with the present invention, the prism holder assembly is precisely fitted in the square through hole 19 of the lens holder assembly, and the prism holder assembly is guided by the square through hole 19 of the lens holder assembly such that it may reciprocate.

FIGS. 1A through 1C show the prism holder assembly with the first and second optical fiber assemblies with lenses in a coupled state and the third and fourth optical fiber assemblies with lenses in a coupled state. As illustrated in FIG. 1B, a parallel beam emitted through the collimator lens 23A of the first optical fiber assembly A with the lens passes through a short side surface 32 of the rectangular prism 25, a short side surface 33 of the rectangular prism 25, and the collimator lens 23B of the second optical fiber assembly B with the lens in the order in which they are listed before reaching the optical fiber 21B as indicated by the white arrows. Similarly, a parallel beam emitted through the collimator lens 23D of the fourth optical fiber assembly D with the lens passes through a short side surface 34 of the rectangular prism 26, a short side surface 35 of the rectangular prism 26, and the collimator lens 23C of the third optical fiber assembly C with the lens in the order in which they are listed before reaching the optical fiber 21C as indicated by the black arrows.

FIGS. 2A through 2C show the prism holder assembly with the first and third optical fiber assemblies with lenses in a coupled state and the second and fourth optical fiber assemblies with lenses in a coupled state. As illustrated in FIG. 2B, a parallel beam emitted through the collimator lens 23A of the first optical fiber assembly A with the lens passes through the collimator lens 23C of the third optical fiber assembly C with the lens and enters the optical fiber 21C as indicated by the white arrow. Similarly, a parallel beam emitted through the collimator lens 23D of the fourth optical fiber assembly D with the lens passes through the collimator lens 23B of the second optical fiber assembly B with the lens and enters the optical fiber 21B as indicated by the black arrow.

The 2×2 optical fiber switch in accordance with the present invention is installed to the prism holding member 24 so that long sides 36 and 37 of the two prisms 25 and 26, respectively, are oriented in the longitudinal direction (Y). The prism holding member 24 is allowed to reciprocate in the direction (X) perpendicular to the surface formed by the optical fiber lens assemblies A and B with lenses and the surface formed by the optical fiber lens assemblies C and D with lenses. This provides an advantage in that the insertion loss is not increased by a failure to align the central point of the prisms 25 and 26 with the optical axes of the optical fiber lens assemblies A, B and the optical fiber lens assemblies C, D when the prism holder assembly is in its advanced position.

More specifically, if the mode field diameter of a light beam emitted from the collimator lens is denoted as $\omega_0$, and the width of the prism in a Y-axis direction is denoted as L, then a permissible error range $\delta$ of the central position of the prisms 25 and 26 can be given by the following expression:

$$\delta \leq L - \omega_0$$

For example, if it is assumed that the mode field diameter $\omega_0$ of a collimator lens having a diameter of 2 mm is 0.3 mm and the width L in the Y-axis direction of the rectangular prism is 3 mm, then it can be seen that the permissible error range $\delta$ of the central position of the prisms 25 and 26 when the prism holder assembly is in its advanced position will be 2.7 mm. In the case of the conventional 2×2 optical fiber switch constituted by using the collimator lenses and prisms, the insertion loss caused by a 0.025 mm decentering of the optical fiber axis when the rectangular prism is in its advanced position is 0.37 dB as previously mentioned. In contrast to this, the 2×2 optical fiber switch in accordance with the present invention hardly develops insertion loss up to a 2.7 mm decentering of the optical axis when the rectangular prism is in its advanced position. This means that complicated assembling adjustment is no longer necessary.

Figure 3A:
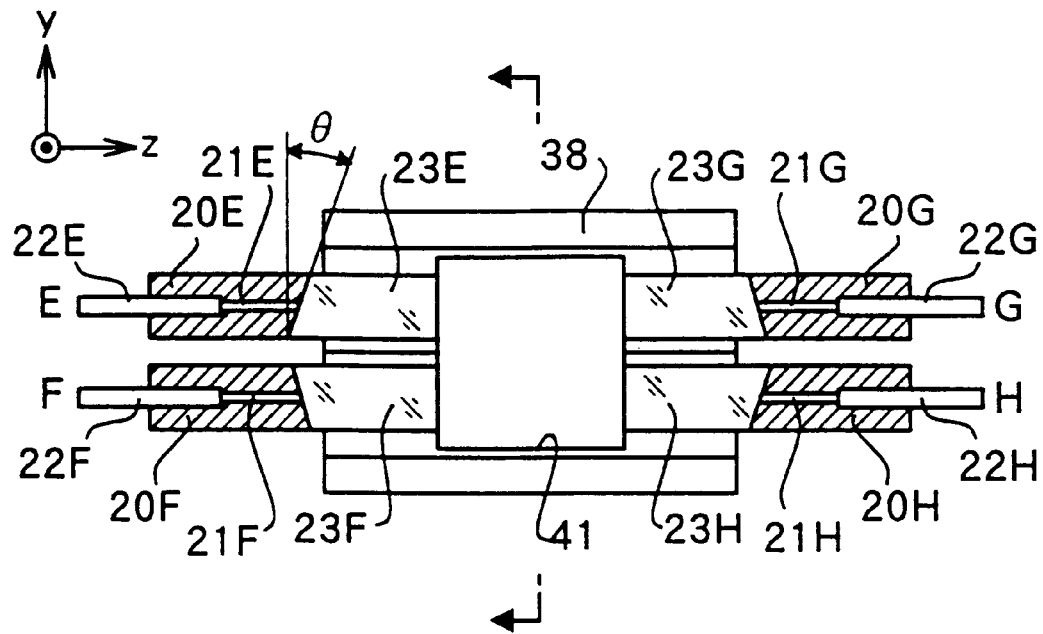
FIG. 3A is a front view illustrating a relationship between optical fibers with lenses and a lens holder of the second embodiment of the 2×2 optical fiber switch in accordance with the present invention.
Figure 3B:
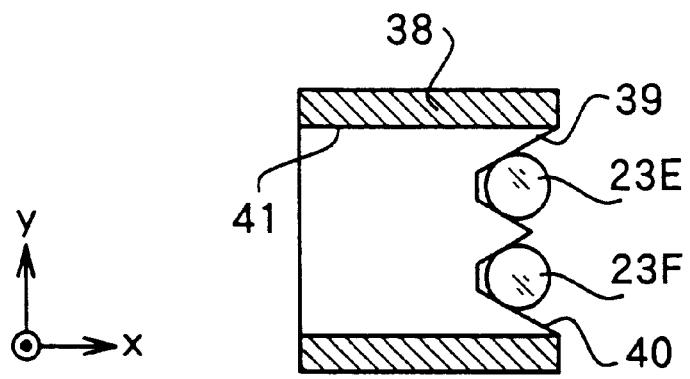
FIG. 3B is a longitudinal sectional view of the foregoing embodiment.
Figure 4A:
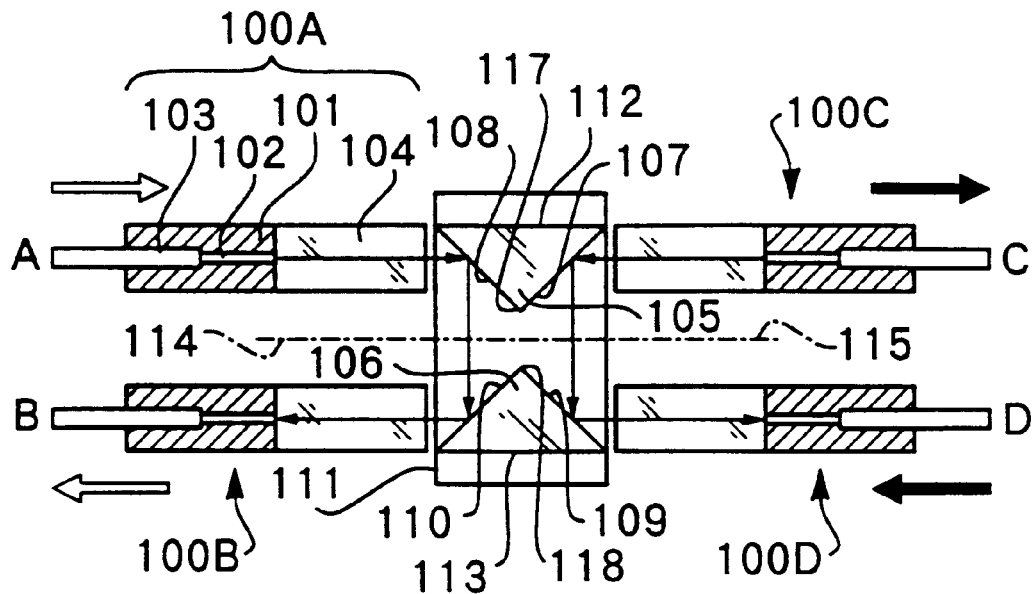
FIG. 4A is a front view illustrating a first relationship between optical fibers with lenses and prisms of a conventional 2×2 optical fiber switch.
Figure 4B:
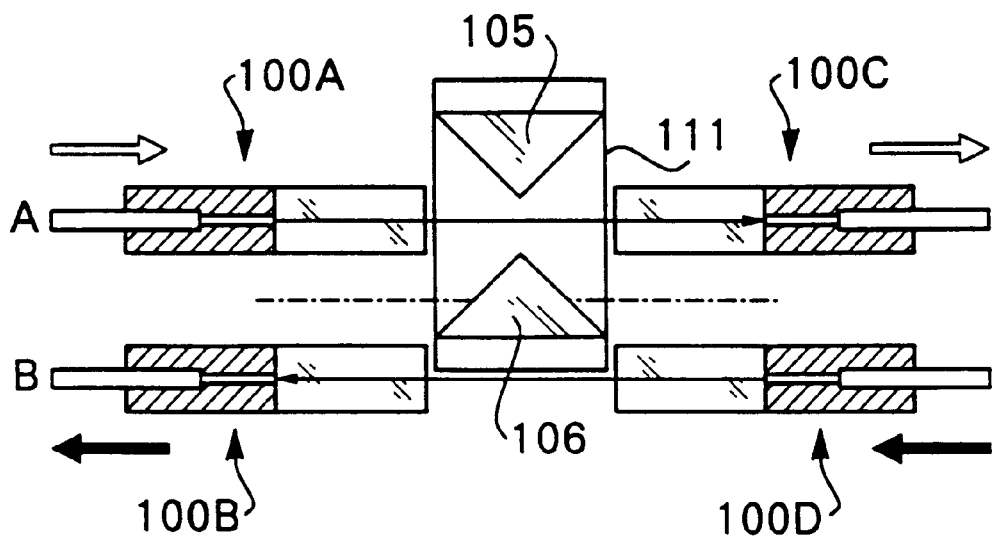
FIG. 4B is a front view illustrating a second relationship between optical fibers with lenses and prisms of a conventional 2×2 optical fiber switch.
Figure 5:
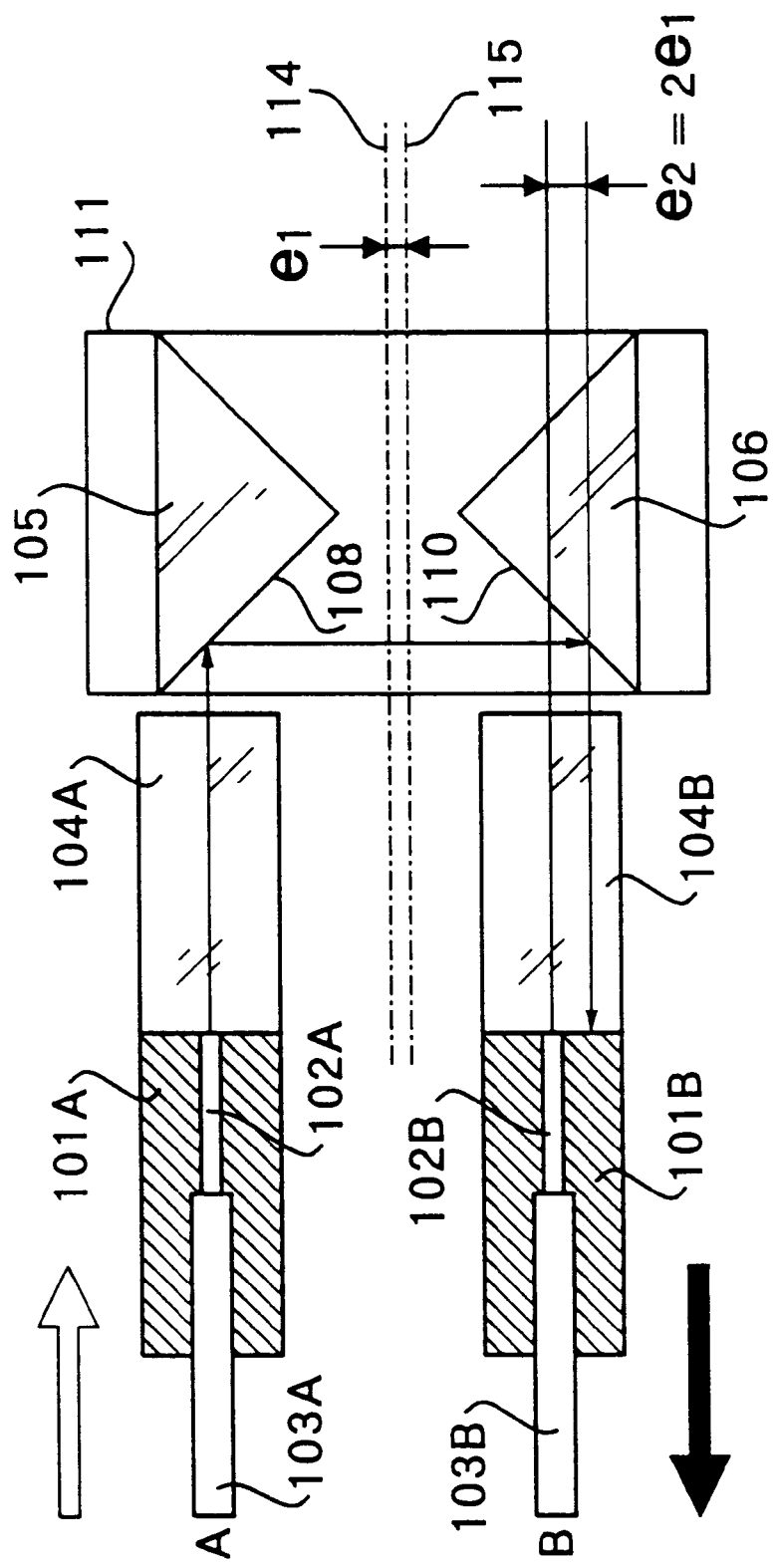
FIG. 5 is a top plan view illustrating a positional error of the prisms of the conventional 2×2 optical fiber switch.
Figure 6:
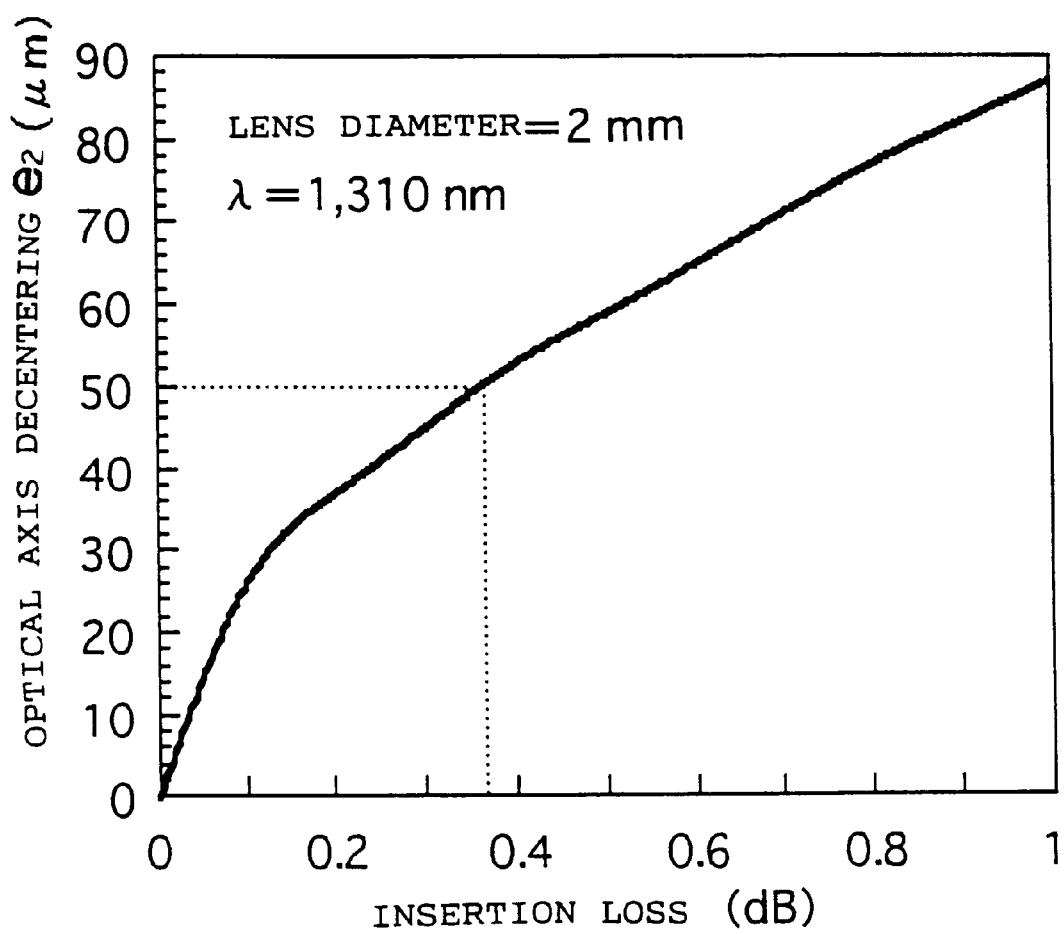
FIG. 6 is a graph showing insertion loss caused by the decentering of an optical axis.

FIG. 3A is a front view illustrating a relationship between optical fibers with lenses and a lens holder of a second embodiment of the 2×2 optical fiber switch in accordance with the present invention, the optical fiber assemblies with lenses being shown in a sectional view. FIG. 3B is a longitudinal sectional view of the foregoing embodiment.

Provided in parallel in the lengthwise direction (Z) on one end surface of a lens holding member 38 are V grooves 39 and 40 for aligning optical fiber lens assemblies E, F, G, and H, an interval being maintained between the V grooves in the direction Y. A square through hole 41 in which the prism holder assembly is movably fitted is provided at the center of the lens holding member 38 in the direction (X) at right angles to the foregoing alignment V grooves 39 and 40. The lens holder assembly is constructed by bonding and fixing the first, second, third, and fourth optical fiber lens assemblies E, F, G, and H with lenses into the alignment V grooves 39 and 40 of the lens holding member 38.

The first optical fiber assembly E with the lens is assembled by inserting an optical fiber 21E and a sleeve 22E into the central hole of a collimator lens 23E and by coaxially attaching a ferrule 20E with the optical fiber thereto. The end surfaces of both the ferrule 20E and a lens 23E may be polished and formed into inclined surfaces having an angle $\theta$ with respect to a surface perpendicular to an optical axis Z. This is for minimizing the quantity of reflected and returned light at a boundary.

The second, third, and fourth optical fiber assemblies F, G, and H with lenses are constructed in the same manner as set forth above. The composition of the prism holder assemblies (not shown) is identical to that of the embodiment described above. As in the case of the aforesaid embodiment, the prism holder assembly is precisely fitted in the square through hole 41 of the lens holder assembly 38. The prism holder assembly is constructed so that it may reciprocate while being guided by the square through hole 41 of the lens holder assembly. The operation of the second embodiment is the same as that of the first embodiment described above; hence, the description thereof will be omitted.

Although the invention has been described in detail above in connection with the preferred embodiments thereof, various modifications can be formed without departing from the spirit and scope of the invention. For instance, convex lenses may be employed instead of the GRIN lenses.

In the conventional 2×2 optical fiber switch, the inaccurate stopping positions of the prisms cause the insertion loss. The composition of the 2×2 optical fiber switch in accordance with the invention has completely solved the problem with the conventional device. In addition, the 2×2 optical fiber switch in accordance with the invention has completely obviates the need of adjustment.

What is claimed is:

1. A 2×2 optical fiber switch comprising:

first and second optical fiber assemblies with lenses disposed so that optical axes thereof are parallel to each other within the same reference plane;

a third optical fiber assembly with a lens disposed oppositely to said first optical fiber assembly with the lens on the same optical axis, an interval being maintained therebetween;

a fourth optical fiber assembly with a lens disposed oppositely to said second optical fiber assembly with the lens on the same optical axis, an interval being maintained therebetween;

a lens holding member for supporting said first through fourth optical fiber assemblies with lenses while maintaining said positional relationship;

a first rectangular prism in which an inclined surface thereof is disposed oppositely to said first optical fiber assembly with the lens and said second optical fiber assembly with the lens so as to optically couple said first optical fiber assembly with the lens to said second optical fiber assembly with the lens;

a second rectangular prism in which an inclined surface thereof is disposed oppositely to said third optical fiber assembly with the lens and said fourth optical fiber assembly with the lens so as to optically couple said third optical fiber assembly with the lens to said fourth optical fiber assembly with the lens; and a prism holding member which supports said first and second rectangular prisms and which is supported by said lens holding member so that it may move between said coupling position and a retreated position in a direction perpendicular to said reference plane.

2. A 2×2 optical fiber switch according to claim 1, wherein said first and second rectangular prisms are respectively inserted and bonded in two rectangular V grooves provided in said prism holding member.

3. A 2×2 optical fiber switch according to claim 1, wherein said lens holding member and said prism holding member are fabricated by plastic injection molding or precision die casting using an aluminum light alloy or the like.

4. A 2×2 optical fiber switch according to claim 1, wherein two through holes are provided in parallel within the reference plane of said lens holding member in order to support the optical fibers with lenses.

5. A 2×2 optical fiber switch according to claim 1, wherein two alignment V grooves are provided in parallel within the reference plane of said lens holding member in order to support the optical fibers with lenses.

6. A 2×2 optical fiber switch according to claim 1, wherein collimator lenses of said optical fibers with lenses are GRIN lenses.

* * * * *